US009053026B2

(12) United States Patent (10) Patent No.: US 9,053,026 B2
Ashok et al. (45) Date of Patent: Jun. 9, 2015

(54) INTELLIGENTLY RESPONDING TO HARDWARE FAILURES SO AS TO OPTIMIZE SYSTEM PERFORMANCE

(71) Applicant: International Business Machines Corporation, Armonk, NY (US)

(72) Inventors: Rohith K. Ashok, Apex, NC (US); Roy F. Brabson, Raleigh, NC (US); Barry P. Gower, Poughkeepsie, NY (US); Hugh E. Hockett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/759,207

(22) Filed: Feb. 5, 2013

(65) Prior Publication Data

US 2014/0223222 A1 Aug. 7, 2014

(51) Int. Cl.
*G06F 11/00* (2006.01)
*G06F 11/07* (2006.01)
*G06F 11/30* (2006.01)
*G06F 9/455* (2006.01)
*G06F 11/14* (2006.01)

(52) U.S. Cl.
CPC ........ *G06F 11/0793* (2013.01); *G06F 11/3051* (2013.01); *G06F 11/3055* (2013.01); *G06F 9/45533* (2013.01); *G06F 11/1484* (2013.01); *G06F 11/0709* (2013.01)

(58) Field of Classification Search
CPC ............ G06F 9/45533; G06F 11/1484; G06F 11/3051; G06F 11/3055
USPC .................................. 714/25, 37, 47.1; 718/1
See application file for complete search history.

(56) References Cited

U.S. PATENT DOCUMENTS

| 7,213,246 | B1 * | 5/2007 | van Rietschote et al. ......... 718/1 |
| 7,966,614 | B2 * | 6/2011 | Chodroff et al. ................. 718/1 |
| 7,975,165 | B2 * | 7/2011 | Shneorson et al. ............... 714/3 |
| 8,185,776 | B1 * | 5/2012 | Gentes et al. ................. 714/4.11 |
| 8,286,174 | B1 * | 10/2012 | Schmidt et al. ............... 718/104 |

(Continued)

OTHER PUBLICATIONS

Mell et al., "The NIST Definition of Cloud Computing," Special Publication 800-145, Sep. 2011.

(Continued)

*Primary Examiner* — Scott Baderman
*Assistant Examiner* — Joseph Kudirka
(74) *Attorney, Agent, or Firm* — Robert A. Voigt, Jr.; Winstead, P.C.

(57) ABSTRACT

A method, system and computer program product for intelligently responding to hardware failures so as to optimize system performance. An administrative server monitors the utilization of the hardware as well as the software components running on the hardware to assess a context of the software components running on the hardware. Upon detecting a hardware failure, the administrative server analyzes the hardware failure to determine the type of hardware failure and analyzes the properties of the workload running on the failed hardware. The administrative server then responds to the detected hardware failure based on various factors, including the type of the hardware failure, the properties of the workload running on the failed hardware and the context of the software running on the failed hardware. In this manner, by taking into consideration such factors in responding to the detected hardware failure, a more intelligent response is provided that optimizes system performance.

16 Claims, 5 Drawing Sheets

(56) References Cited

U.S. PATENT DOCUMENTS

| | | | | |
|---|---|---|---|---|
| 8,843,935 | B2* | 9/2014 | Hegdal et al. | 718/104 |
| 2006/0085785 | A1* | 4/2006 | Garrett | 718/1 |
| 2008/0189468 | A1* | 8/2008 | Schmidt et al. | 711/6 |
| 2008/0189700 | A1* | 8/2008 | Schmidt et al. | 718/1 |
| 2010/0107158 | A1* | 4/2010 | Chen et al. | 718/1 |
| 2010/0333089 | A1* | 12/2010 | Talwar et al. | 718/1 |
| 2011/0231696 | A1* | 9/2011 | Ji et al. | 714/3 |
| 2012/0151474 | A1 | 6/2012 | Brian et al. | |
| 2012/0232948 | A1 | 9/2012 | Wolf et al. | |
| 2013/0036324 | A1* | 2/2013 | Nagasawa | 714/4.11 |
| 2013/0074065 | A1* | 3/2013 | McNeeney et al. | 718/1 |
| 2013/0305092 | A1* | 11/2013 | Jayachandran et al. | 714/37 |
| 2014/0059392 | A1* | 2/2014 | Ren et al. | 714/47.1 |

OTHER PUBLICATIONS

"High Availability with IBM PowerHA," http://www-03.ibm.com/systems/power/software/availability/, 2013.

"VMware vSphere Fault Tolerance (FT) for Zero Downtime," http://www.vmware.com/products/datacenter-virtualization/vsphere/fault-tolerance.html, 2013.

"VMware vSphere High Availability (HA)," http://www.vmware.com/products/datacenter-virtualization/vsphere/high-availability.html, 2013.

Vishwanath et al., "Characterizing Cloud Computing Hardware Reliability," http://research.microsoft.com/pubs/120439/socc088-vishwanath.pdf, SoCC'10, Jun. 10-11, 2010.

Markus Adolf Hedwig, "Sustainable and Efficient Management of Enterprise Information Systems: Strategies & Operation Modes," http://www.freidok.uni-freiburg.de/volltexte/8472/pdf/Thesis_Online.pdf, Inaugural-Dissertation zur Erlangung der Doktorwürde, der Wirtschafts- und Verhaltenswissenschaftlichen Fakultät der Albert-Ludwigs-Universität Freiburg i. Br., 2012, pp. 1-194.

Office Action for U.S. Appl. No. 14/067,153 dated Oct. 15, 2014, pp. 1-25.

* cited by examiner

INTELLIGENTLY RESPONDING TO HARDWARE FAILURES SO AS TO OPTIMIZE SYSTEM PERFORMANCE

TECHNICAL FIELD

The present invention relates generally to cloud computing, and more particularly to intelligently responding to hardware failures so as to optimize system performance.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The functions of the cloud computing environment are performed by a data center, which includes disparate hardware components (e.g., storage controllers, network switches, physical compute machines) which are integrated amongst each other. Currently, hardware failures, such as central processing unit core failures, dual in-line memory module failures, adapter card failures, etc. are reported to the hardware management components, which may later be reported to the customers.

Since the data centers of cloud computing environments can be large (large number of hardware and software components) and complex, the failure reporting can be complex and exhaustive. Furthermore, since the data centers of cloud computing environments can be large and complex, response systems have difficulty in responding to such hardware failures in a manner that ensures continuity of service for the customer that meets the customer's service requirements. Such response systems respond to hardware failures based on locating alternative devices to continue the processing of the failed hardware without understanding the context of the software running on the hardware. For example, a response system may respond to a hardware failure by transferring the processing of the failed compute machine to a new compute machine to handle. By not taking into consideration the context of the software running on the hardware, other alternatives that may be viable, such as creating a new virtual machine to make up for the lost capacity, are not considered. As a result, such response systems are deficient in responding to hardware failures thereby degrading system performance.

BRIEF SUMMARY

In one embodiment of the present invention, a method for intelligently responding to hardware failures so as to optimize system performance comprises monitoring utilization of hardware in a system. The method further comprises monitoring software components running on the hardware in the system to assess a context of the software components running on the hardware. Furthermore, the method comprises detecting a hardware failure. Additionally, the method comprises analyzing the hardware failure to determine a type of the hardware failure. The method additionally comprises analyzing properties of a workload running on the failed hardware. In addition, the method comprises responding, by a processor, to the detected hardware failure based on the type of the hardware failure, the properties of the workload running on the failed hardware and the context of the software running on the failed hardware.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
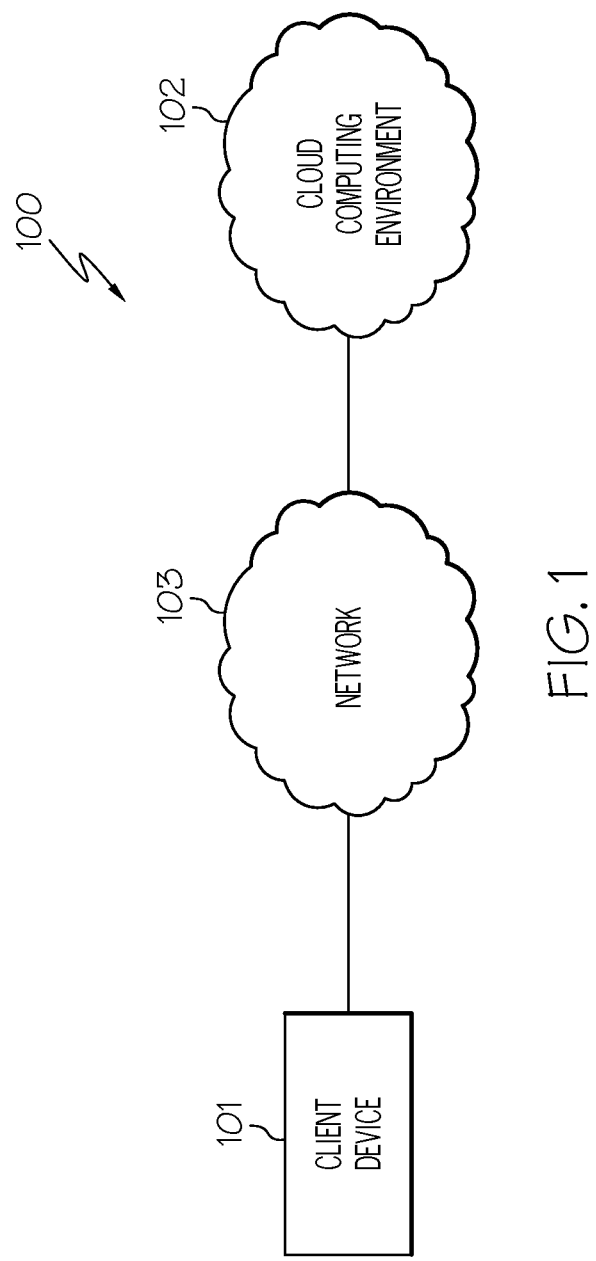
FIG. 1 illustrates a network system configured in accordance with an embodiment of the present invention.

The present invention comprises a method, system and computer program product for intelligently responding to hardware failures so as to optimize system performance. In one embodiment of the present invention, an administrative server monitors the utilization of the hardware in the cloud computing environment (e.g., monitoring the storage, network, memory and compute capacity of the cloud computing environment). Furthermore, the administrative server monitors the software components running on the hardware in the cloud computing environment to assess a context of the software components running on the hardware. Upon detecting a hardware failure, the administrative server analyzes the hardware failure to determine the type of hardware failure. Furthermore, the administrative server analyzes the properties of the workload (e.g., policies and pattern of workload) running on the failed hardware. The administrative server then responds to the detected hardware failure based on various factors, including the type of the hardware failure, the properties of the workload running on the failed hardware and the context of the software running on the failed hardware. In this manner, by taking into consideration such factors in responding to the detected hardware failure, a more intelligent response is provided that optimizes system performance.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
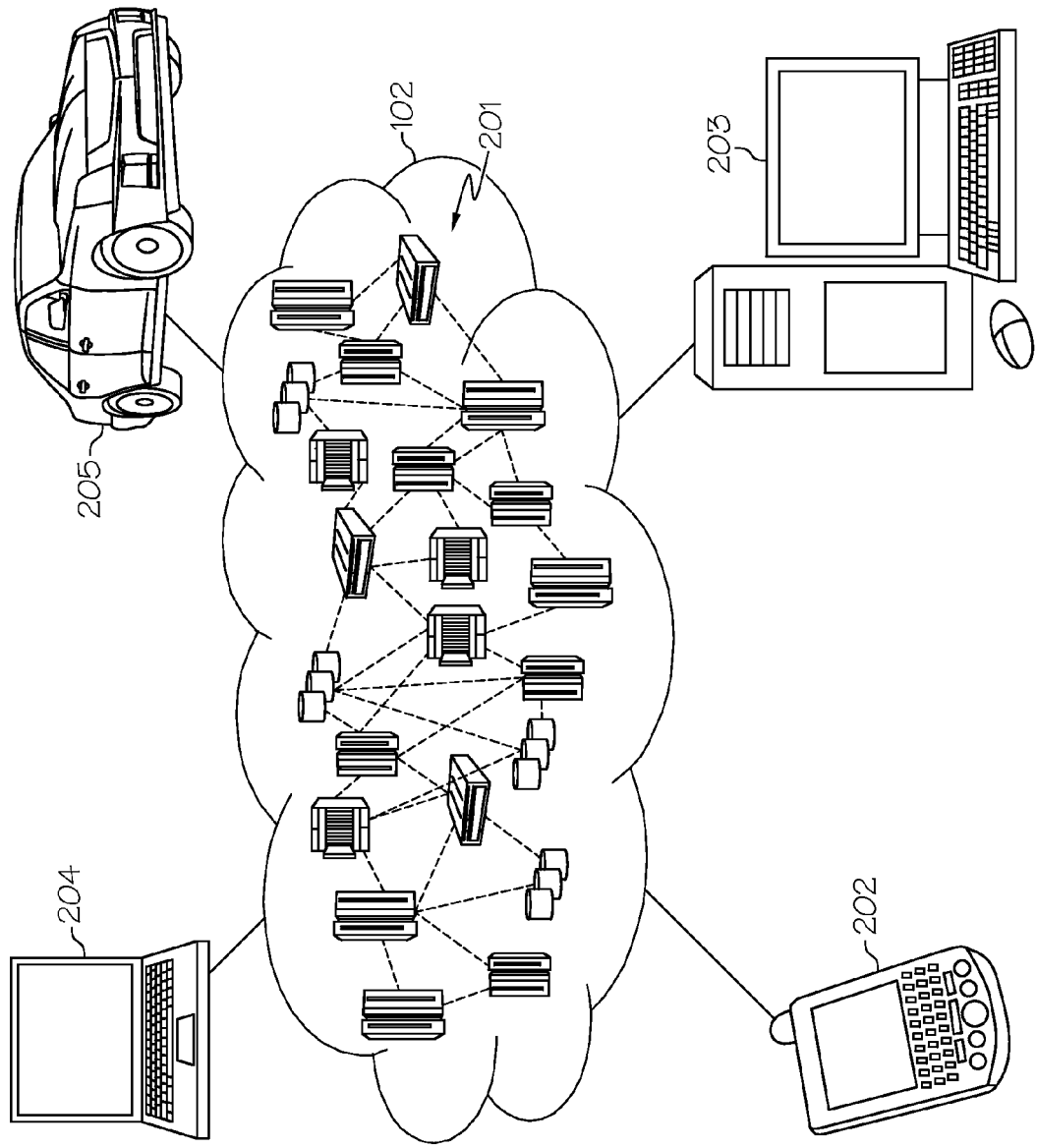
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
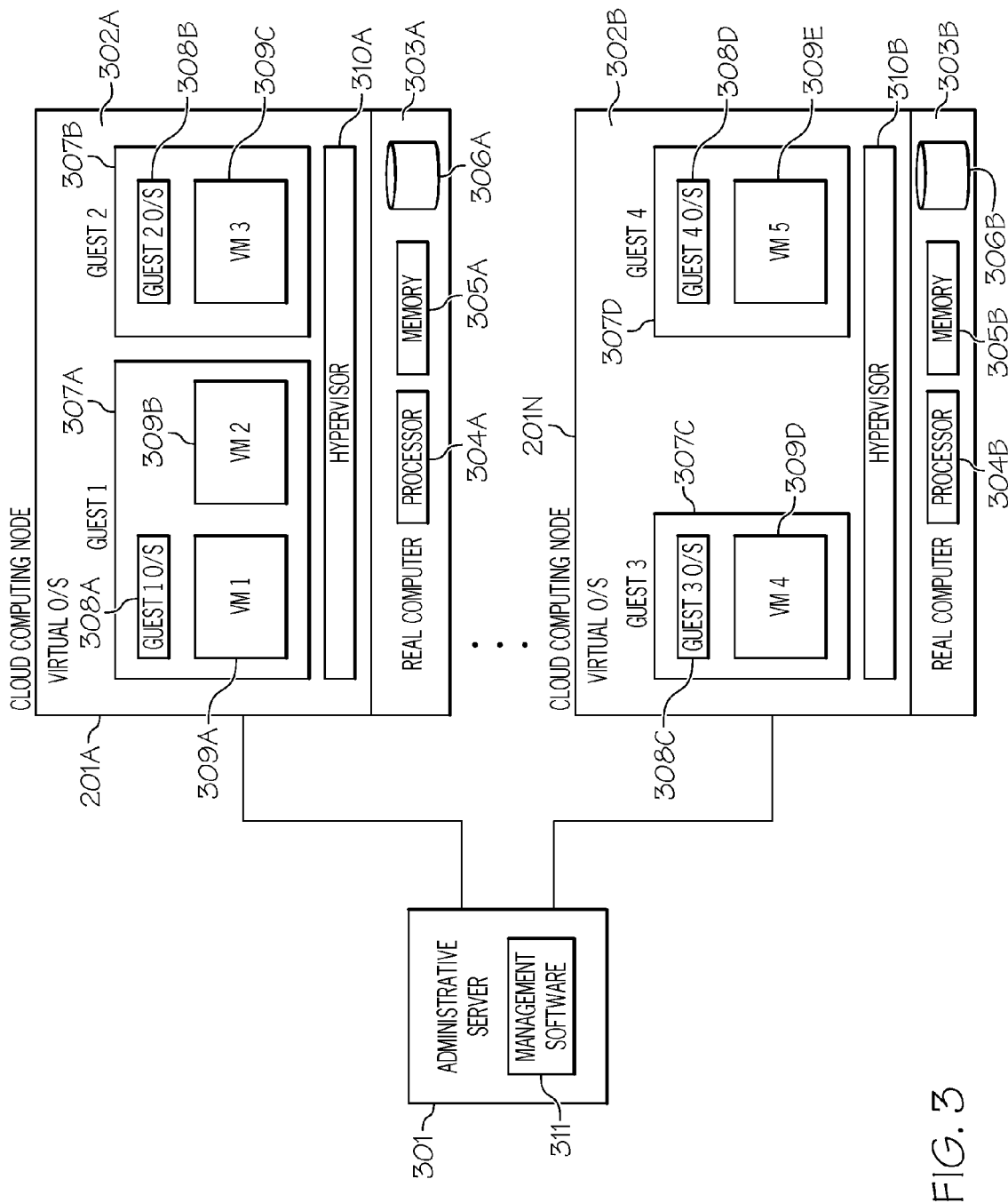
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the management software 311, that can be used to manage all the hardware components of cloud computing nodes 201, monitor system utilization, intelligently deploy images of data and optimize the operations of cloud computing environment 102. Furthermore, management software 311 can be used to intelligently respond to hardware failures so as to optimize system performance as discussed further below. A description of the hardware configuration of administrative server 301 is provided further below in connection with FIG. 4.

Figure 4:
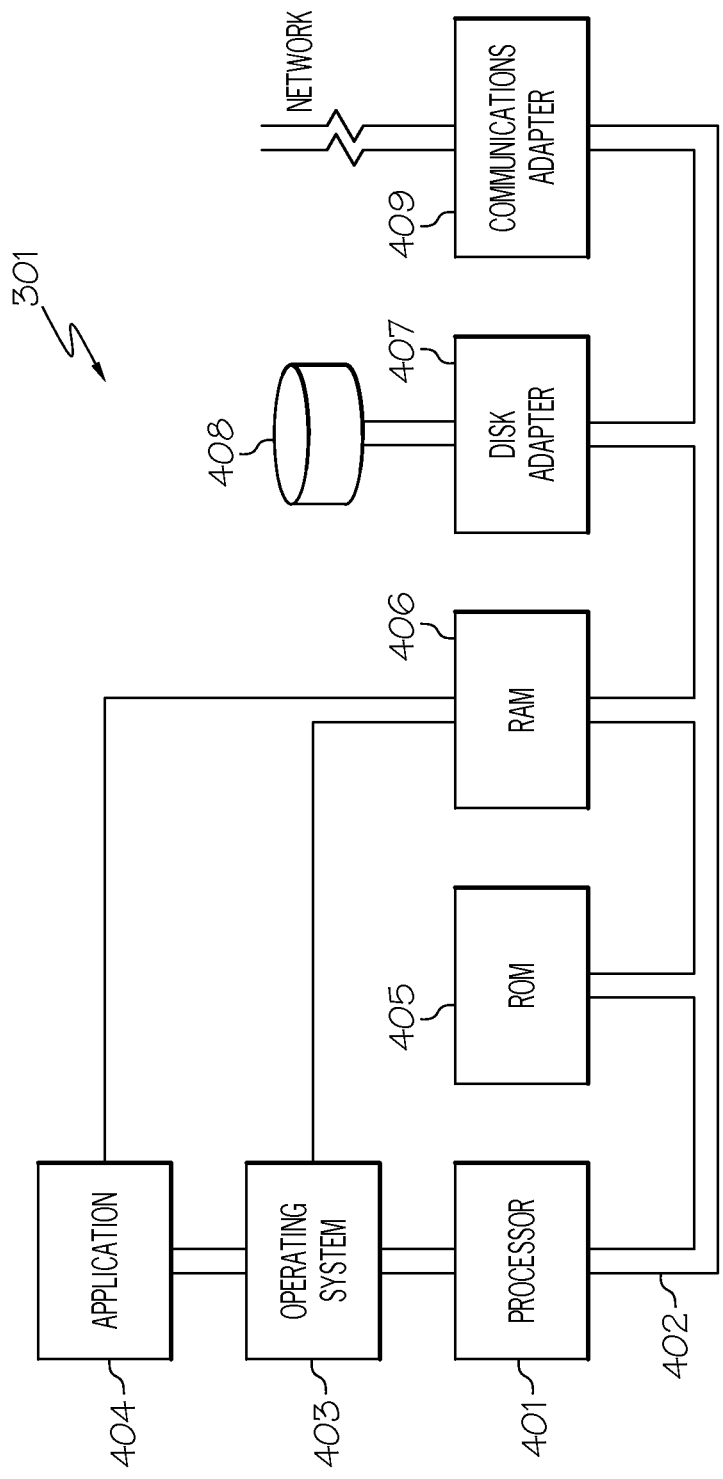
FIG. 4 illustrates a hardware configuration of an administrative server configured in accordance with an embodiment of the present invention.

Referring now to FIG. 4, FIG. 4 illustrates a hardware configuration of administrative server 301 (FIG. 4) which is representative of a hardware environment for practicing the present invention. Administrative server 301 has a processor

401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program, such as management software 311 of FIG. 3, for intelligently responding to hardware failures so as to optimize system performance as discussed further below in association with FIG. 5.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for intelligently responding to hardware failures so as to optimize system performance, as discussed further below in association with FIG. 5, may reside in disk unit 408 or in application 404.

Administrative server 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the functions of the cloud computing environment are performed by a data center, which includes disparate hardware components (e.g., storage controllers, network switches, physical compute machines) which are integrated amongst each other. Currently, hardware failures, such as central processing unit core failures, dual in-line memory module failures, adapter card failures, etc. are reported to the hardware management components, which may later be reported to the customers. Since the data centers of cloud computing environments can be large (large number of hardware and software components) and complex, the failure reporting can be complex and exhaustive. Furthermore, since the data centers of cloud computing environments can be large and complex, response systems have difficulty in responding to such hardware failures in a manner that ensures continuity of service for the customer that meets the customer's service requirements. Such response systems respond to hardware failures based on locating alternative devices to continue the processing of the failed hardware without understanding the context of the software running on the hardware. For example, a response system may respond to a hardware failure by transferring the processing of the failed compute machine to a new compute machine to handle. By not taking into consideration the context of the software running on the hardware, other alternatives that may be viable, such as creating a new virtual machine to make up for the lost capacity, are not considered. As a result, such response systems are deficient in responding to hardware failures thereby degrading system performance.

The principles of the present invention provide a means for intelligently responding to hardware failures by taking into consideration the type of hardware failure, the properties of the workload running on the failed hardware and the context of the software running on the failed hardware so as to optimize system performance as discussed below in connection with FIG. 5.

Figure 5:
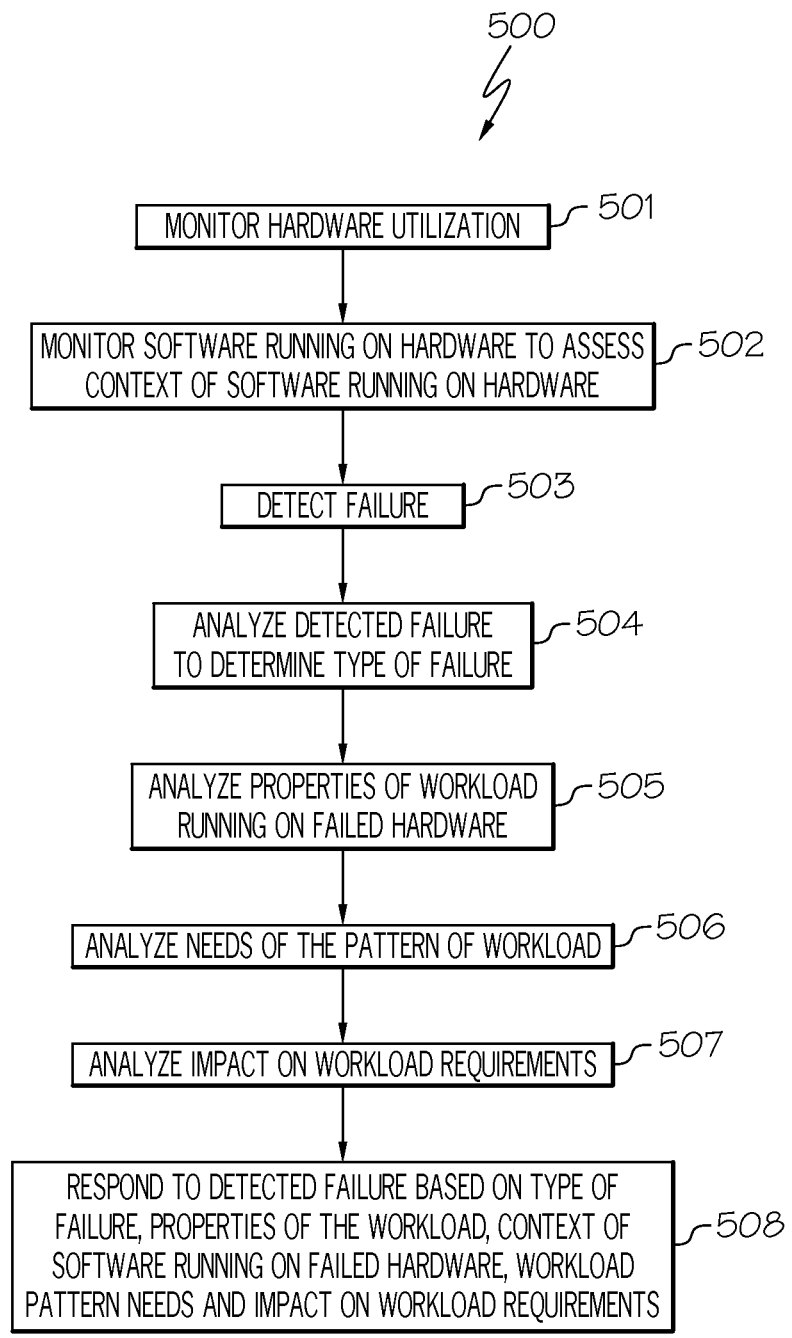
FIG. 5 is a flowchart of a method for intelligently responding to hardware failures so as to optimize system performance in accordance with an embodiment of the present invention.

FIG. 5 is a flowchart of a method 500 for intelligently responding to hardware failures so as to optimize system performance in accordance with an embodiment of the present invention.

Referring to FIG. 5, in conjunction with FIGS. 1-4, in step 501, administrative server 301 monitors the utilization of the hardware of cloud computing environment 102. Such monitoring may include monitoring of the storage, networking, memory and compute capacity of cloud computing environment 102.

In step 502, administrative server 301 monitors the software components (e.g., virtual machines 309) running on the hardware in cloud computing environment 102. In one embodiment, by monitoring the software components running on the hardware in cloud computing environment 102, administrative server 301 can assess the context of the software running on the hardware. For example, the context of virtual machine 309 running a program may be assessed.

In step 503, administrative server 301 detects a hardware failure. "Hardware failure," as used herein, refers to any malfunction within the electronic circuits or electromechanical components (e.g., disks) of a hardware component, such as storage, networking, memory and computing components.

In step 504, administrative server 301 analyzes the detected failure so as to determine the type of failure.

In step 505, administrative server 301 analyzes the properties of the workload running on the failed hardware. A "workload" refers to the amount of processing that a hardware component has been given to do at a given time. The "properties" of a workload may include the policies (e.g., high availability policies) and the pattern of the workload. The "pattern" of a workload refers to the collection of virtual machines 309 on cloud computing nodes 201 to perform the required processing of the workload.

In step 506, administrative server 301 analyzes the needs of the pattern of the workload. The needs of the pattern of the workload refer to the resources required by the workload, such as the resources required by virtual machines 309, as discussed further below.

In step 507, administrative server 301 analyzes the impact on workload requirements.

In step 508, administrative server 301 responds to the detected failure based on the type of failure, the properties of the workload running on the failed hardware, the context of the software running on the failed hardware, the needs of the workload pattern and the impact on workload requirements. For example, depending on the type of failure, such as a dual in-line memory module failure, the hardware itself may be able to isolate the failure and keep it from causing downtime. In such cases, administrative server 301 will determine if sufficient memory is present to keep the workload on that damaged hardware (e.g., server), move it to another location or recreate the workload elsewhere if needed.

As discussed above, the properties of the workload running on the failed hardware may be used as a factor in determining the appropriate response to the detected failure. For example, where high availability is critical, administrative server 301 may create an additional image of the workload pattern running on a hardware (e.g., server) that appears likely to fail and place it in hot-standby mode (a hot spare or hot standby is used as a failover mechanism to provide reliability in system configurations) to help quickly regain high availability. As a result, when the hardware failure does occur, the image can be quickly regained. In another example, the properties of the workload, such as high availability policies, may be used to determine when a virtual machine should be recreated or moved. In a further example, the pattern of the workload may be used as a factor in determining the appropriate response to the detected failure by determining what is the current collection of virtual machines 309 that is being used to run the workload thereby determining if a damaged ephemeral virtual machine 309 (i.e., a short-lived virtual machine 309) in the pattern of virtual machines 309 could be recreated to pick up the lost work.

An example of using the context of the software running on the failed hardware as a factor in determining the appropriate response to the detected failure includes determining if the virtual machine 309 running on the failed hardware is rated high priority. If so, then virtual machine 309 may be relocated to a different hardware component (e.g., server) or a new hot standby virtual machine 309 may be spun up to take over the processing of virtual machine 309 running on the failed hardware.

As also discussed above, the workload pattern needs may be used as a factor in determining the appropriate response to the detected failure. The needs of the workload pattern may include individual virtual machine resource requirements (i.e., resource requirements for each virtual machine 309 in the pattern) and how virtual machines 309 work together in the pattern. For example, each virtual machine 309 in the collection of virtual machines 309 forming the workload pattern requires a certain amount of resources (e.g., memory, networking, storage, central processing unit). Such consideration may be used to determine an appropriate response to the detected failure.

As further discussed above, the impact on workload requirements may also be used as a factor in determining the appropriate response to the detected failure. For example, the impact on the workload requirements, such as the central processing unit, memory, networking and storage requirements, may be used to determine an appropriate response to the detected failure.

As a result of taking into consideration the type of hardware failure, the properties of the workload running on the failed hardware, the context of the software running on the failed hardware, the needs of the workload pattern and the impact on workload requirements in responding to a detected hardware failure, a more intelligent response is performed that optimizes system performance.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a computer readable storage medium for intelligently responding to hardware failures so as to optimize system performance, the computer programming product comprising programming instructions for:
    monitoring utilization of hardware in a system;
    monitoring software components running on said hardware in said system to assess a context of said software components running on said hardware;
    detecting a hardware failure;
    analyzing said hardware failure to determine a type of said hardware failure;
    analyzing properties of a workload running on said failed hardware, wherein said workload running on said failed hardware comprises an amount of processing that said failed hardware has been given to do at a given time, wherein said properties of said workload running on said hardware comprise creating an additional image of a pattern of said workload running on said hardware and placing said image of said pattern of said workload in a hot-standby mode in response to said hardware appearing likely to fan; and
    responding to said detected hardware failure based on said type of said hardware failure, said properties of said workload running on said failed hardware, and said context of said software running on said failed hardware.

2. The computer program product as recited in claim 1, wherein said monitoring of said utilization of said hardware in said system comprises monitoring storage, networking, memory, and compute capacity.

3. The computer program product as recited in claim 1, wherein said properties of said workload comprise policies.

4. The computer program product as recited in claim 3, wherein said pattern of said workload comprises a collection of virtual machines.

5. The computer program product as recited in claim 4 further comprising the programming instructions for:
    analyzing needs of said pattern of said workload; and
    responding to said detected hardware failure is further based on said needs of said pattern of said workload.

6. The computer program product as recited in claim 5, wherein said needs of said pattern of said workload comprise individual virtual machine resource requirements and how said virtual machines work together in said pattern.

7. The computer program product as recited in claim 1 further comprising the programming instructions for:
    analyzing an impact on workload requirements; and
    responding to said detected hardware failure is further based on said impact on workload requirements.

8. The computer program product as recited in claim 1, wherein said monitoring of said software components running on said hardware in said system to assess said context of said software components running on said hardware comprises determining if a virtual machine running on said failed hardware is rated high priority.

9. A system, comprising:
    a memory unit for storing a computer program for intelligently responding to hardware failures so as to optimize system performance; and
    a processor coupled to said memory unit, wherein said processor, responsive to said computer program, comprises:
    circuitry for monitoring utilization of hardware in a system;
    circuitry for monitoring software components running on said hardware in said system to assess a context of said software components running on said hardware;
    circuitry for detecting a hardware failure;
    circuitry for analyzing said hardware failure to determine a type of said hardware failure;
    circuitry for analyzing properties of a workload running on said failed hardware, wherein said workload running on said failed hardware comprises an amount of processing that said failed hardware has been given to do at a given time, wherein said properties of said workload running on said hardware comprise creating an additional image of a pattern of said workload running on said hardware and placing said image of said pattern of said workload in a hot-standby mode in response to said hardware appearing likely to fail; and
    circuitry for responding to said detected hardware failure based on said type of said hardware failure, said properties of said workload running on said failed hardware, and said context of said software running on said failed hardware.

10. The system as recited in claim 9, wherein said monitoring of said utilization of said hardware in said system comprises monitoring storage, networking, memory, and compute capacity.

11. The system as recited in claim 9, wherein said properties of said workload comprise policies.

12. The system as recited in claim 11, wherein said pattern of said workload comprises a collection of virtual machines.

13. The system as recited in claim 12, wherein said processor further comprises:
    circuitry for analyzing needs of said pattern of said workload; and
    circuitry for responding to said detected hardware failure is further based on said needs of said pattern of said workload.

14. The system as recited in claim 13, wherein said needs of said pattern of said workload comprise individual virtual machine resource requirements and how said virtual machines work together in said pattern.

15. The system as recited in claim 9, wherein said processor further comprises:

circuitry for analyzing an impact on workload requirements; and circuitry for responding to said detected hardware failure is further based on said impact on workload requirements.

16. The system as recited in claim 9, wherein said monitoring of said software components running on said hardware in said system to assess said context of said software components running on said hardware comprises determining if a virtual machine running on said failed hardware is rated high priority.

* * * * *